United States Patent [19]

Snyder

[11] Patent Number: 4,733,904
[45] Date of Patent: Mar. 29, 1988

[54] SUN ROOF

[75] Inventor: Steven A. Snyder, Sturgis, Mich.

[73] Assignee: Sparkomatic Corporation, Milford, Pa.

[21] Appl. No.: 256,703

[22] Filed: Jun. 23, 1981

[51] Int. Cl.$^4$ ............................................. B60J 7/195
[52] U.S. Cl. ..................................... 296/213; 296/216
[58] Field of Search ........................ 296/213, 216, 218

[56] References Cited

U.S. PATENT DOCUMENTS

| | | | |
|---|---|---|---|
| 4,118,063 | 10/1978 | Bienert | 296/218 |
| 4,226,052 | 10/1980 | De Stepheno | 296/218 |
| 4,231,608 | 11/1980 | Sorensen | 296/216 |
| 4,289,349 | 9/1981 | Symeonidis | 296/213 |
| 4,296,961 | 10/1981 | Hunt | 296/216 |
| 4,323,277 | 4/1982 | Rengstl | 296/216 |
| 4,337,975 | 7/1982 | Tamamushi | 296/218 |
| 4,342,481 | 8/1982 | Kanou | 296/218 |

Primary Examiner—Andres Kashnikow
Attorney, Agent, or Firm—Mason, Fenwick & Lawrence

[57] ABSTRACT

A sun roof assembly and seal therefor comprises a flexible ring shaped member having a base with a groove therein for receiving a continuous rigid bead on the frame of the sun roof and a tubular bulb positioned on the upper wall of the base. When the cover of the sun roof is opened the upper wall of the bulb springs upwardly above the level of the roof in which the sun roof is installed, but when the cover is closed, the upper wall of the bulk is compressed against the base above the rigid bead to seal the sun roof against leakage.

17 Claims, 3 Drawing Figures

U.S. Patent    Mar. 29, 1988    4,733,904
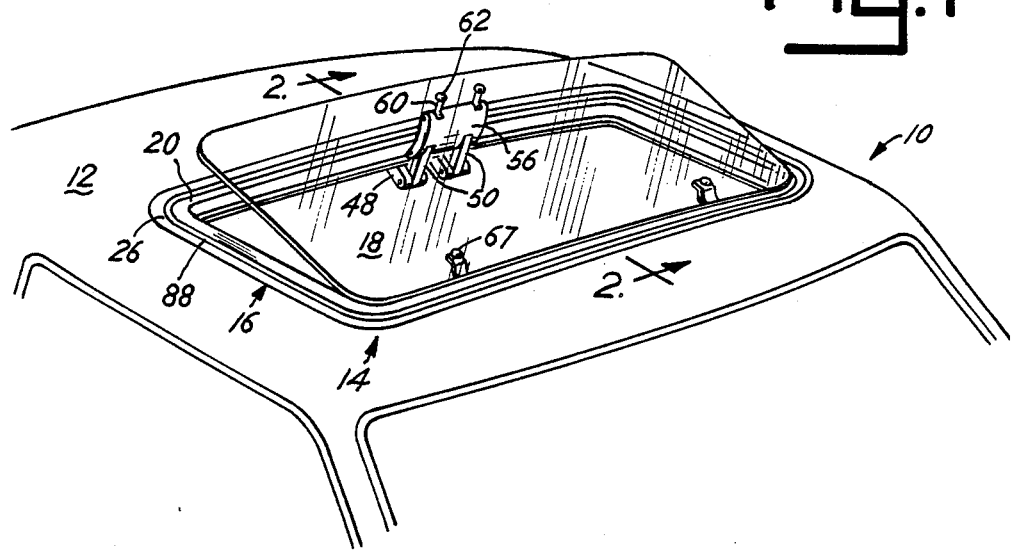
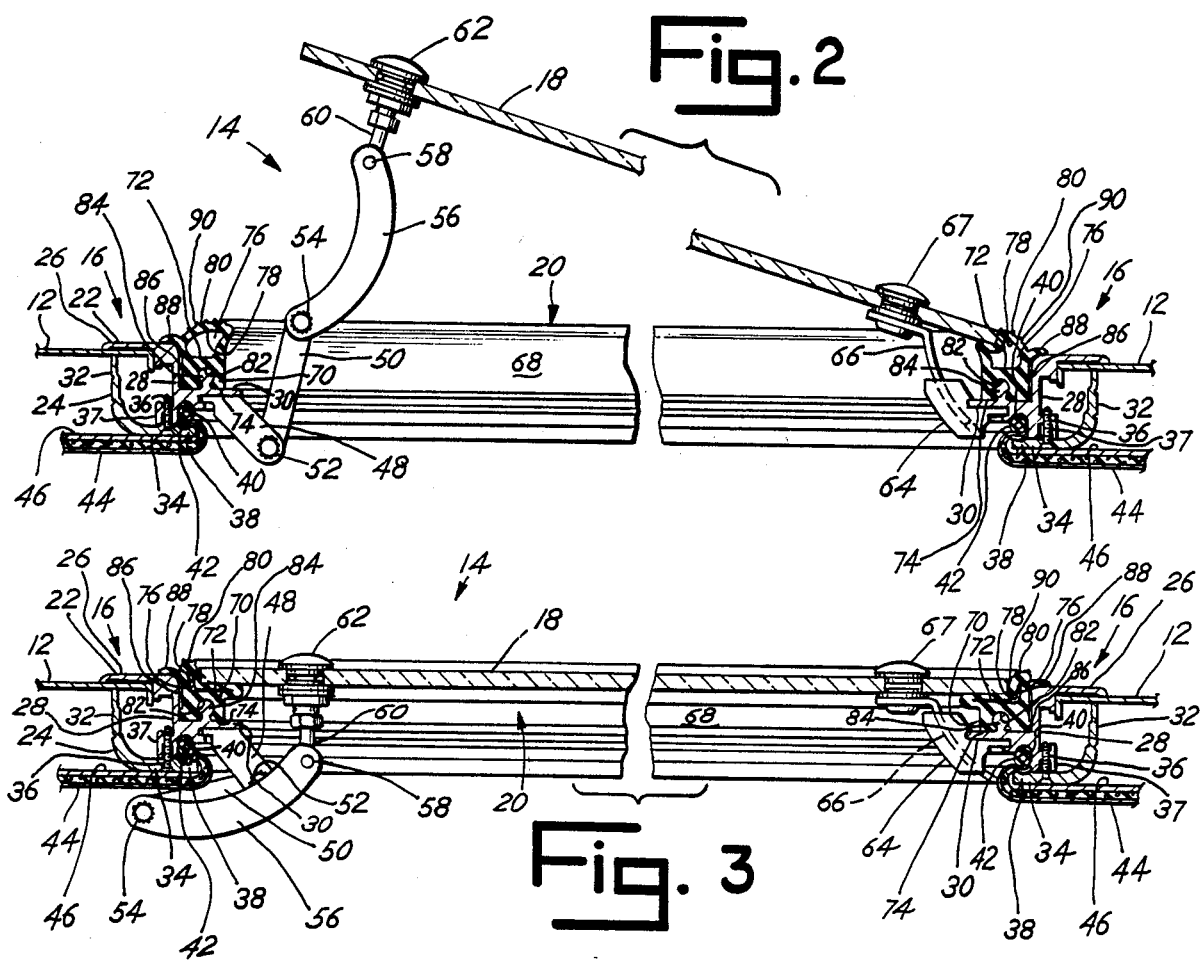

SUN ROOF

BACKGROUND AND SUMMARY OF THE INVENTION

This invention relates to a sun roof for a vehicle and, more particularly, to a sun roof assembly and seal therefor.

It is important in sun roof constructions that leakage of water into the vehicle is avoided. In prior sun roof constructions various seals and sealing arrangements have been employed with varying degrees of success for this purpose.

In the present invention a sun roof assembly and seal therefor is provided which effectively prevents the leakage of water through the roof in a simple and effective manner and in a manner which is capable of rapid and inexpensive manufacture and installation in the vehicle. In the sun roof incorporating the principles of the invention, a sealing arrangement is provided which not only effectively seals the space between the sun roof cover and the rigid frame of the assembly at all times with a low pressure seal when the cover is closed, but which is also positioned and constructed to spring upwardly to a position to minimize the ingress into the vehicle of any residual water which may be on the roof of the vehicle or the seal itself when the cover is opened. The assembly and seal of the present invention effectively forms a low pressure seal between the cover and a rigid bead on the sun roof frame when the cover is closed and also overlies the roof of the vehicle to prevent ingress of water between the sun roof frame and the roof. The assembly of the present invention also provides a construction for attachment of the vehicle headliner.

In one principal aspect of the present invention, a seal for a vehicle sun roof includes a flexible ring shaped member substantially defining the shape and perimeter dimensions of the cover of the sun roof. The flexible ring shaped member includes a base member having upper and bottom walls and a tubular bulb means positioned on the upper wall of the base member and extending substantially continuously around the top of the base member. The bulb means is hollow and includes interior and exterior walls. A substantially continuous groove means in the bottom wall of the base member extends upwardly toward the upper wall of the base member. The groove means is adapted to snugly receive a rigid bead on the sun roof frame when the ring shaped member is installed in the sun roof and this groove means also has substantially the same shape and perimeter dimensions as the cover of the sun roof. The tubular bulb means is sufficiently flexible and positioned relative to the groove means such that when the sun roof cover is closed, the interior wall of the tubular bulb means is compressed against the upper wall of the base member substantially vertically above said groove and the flexible material between the groove means in the upper wall of the base member is compressed in a vertical direction, and when the sun roof cover is opened, the bulb means springs upwardly to a level above the elevation of the vehicle roof in which the sun roof is installed and the upper interior wall of the bulb means and the upper wall of the base member are separated.

In another principal aspect of the present invention, the seal just described is positioned in a sun roof assembly, the latter of which includes a substantially continuous ring shaped frame means and at least one substantially continuous bead on the frame means extending upwardly from a horizontal portion of the frame means and snugly into the groove means of the flexible ring shaped member, and has perimeter dimensions substantially the same as the shape and dimensions of the bead such that when the sun roof cover is closed, the flexible generally ring shaped member and the tubular bulb means are compressed vertically between the edge of the sun roof cover and the bead.

These and other objects, features and advantages of the present invention will become readily understood upon a consideration of the following detailed description.

BRIEF DESCRIPTION OF THE DRAWING

In the course of this description, the drawing will be frequently referred to in which:

FIG. 1 is a perspective view of the roof of a vehicle in which a preferred embodiment of the sun roof of the present invention has been installed;

FIG. 2 is a cross sectioned side elevational view of the sun roof in the opened condition as viewed substantially along line 2—2 of FIG. 1; and FIG. 3 is a cross sectioned side elevational view of the sun roof shown in FIG. 2, but in the closed condition.

DESCRIPTION OF THE PREFERRED EMBODIMENT

In FIG. 1 a vehicle 10 is shown having a roof 12 in which a preferred embodiment of the sun roof assembly of the present invention, generally 14, is shown installed. The sun roof assembly 14 includes a sun roof frame 16 which mates with the roof 12 of the vehicle, a cover 18 formed of a transparent material, such as glass, and the seal 20 of the present invention.

Referring particularly to FIGS. 2 and 3 in which the sun roof is shown in greater detail, the frame 16 is preferably formed of two elements 22 and 24. Frame element 22 comprises a continuous ring shaped member having a horizontal portion 26 which overlies the roof 12 of the vehicle and is shaped substantially identical to the opening cut in the roof to accommodate the sun roof assembly. Element 22 also includes a vertical portion 28 extending downwardly from the interior edge of horizontal portion 26, and a horizontally inwardly extending flange portion 30 extending inwardly from the vertical portion 28. Each of the portions 26, 28 and 30 are preferably formed integrally with each other and of metal, such as aluminum.

The second frame element comprises a substantially L-shaped member 24 extending beneath the roof 12 of the vehicle and having a vertical portion 32 which extends upwardly into contact with the underside of roof 12 and a horizontal portion 34 which extends beneath and contacts the lower edge of the vertical portion 28 of element 22 as shown in FIGS. 2 and 3. Portions 32 and 34 are also preferably formed integrally with each other and of metal, such as aluminum.

The sun roof frame 16 is firmly attached to the perimeter of the opening in the vehicle roof 12 by screws 36 which clamp the elements 22 and 24 together and lock them to the roof 12. The screws 36 extend through spaced holes in the horizontal portion 34 of the element 24 and are tapped into a ring shaped channel 37 which is formed integrally with the vertical portion 28 of element 22. The channel 37 extends from and around the outer side of the vertical portion 28 adjacent its bottom. Thus, the screws 36 firmly draw elements 22 and 24 together and into clamping arrangement with the roof 12.

The inner edge of the horizontal portion 34 of the frame element 24 preferrably extends beyond the vertical portion 28 of element 22 to form a grooved flange 38. A complimentary groove 40 is formed at the juncture between the horizontal flange portion 30 and vertical portion 28 of frame element 22. Grooves 38 and 40 are adapted to receive a headliner retainer 42 which may, for example, comprise upholstering cord or other material which is tucked into the grooves to retain the headliner 44 and its backing 46 in the sun roof frame.

One or more rigid hinge links 48 are also preferably attached to the horizontal flange portion 30 of element 22 by suitable means, such as screws (not shown). One or more second links 50 are pivotally coupled to the links 48 by suitable pivot means, such as knurled screw 52 as shown in FIG. 2. The other ends of links 50 are pivotally coupled at 54 to an elongated link 56 which is adapted to be grasped by a passenger in the vehicle for opening and closing the cover 18. Link 56, in turn, is pivotally coupled at 58 to one or more pins 60 which are attached to cover 18 by suitable means, such as rivets 62.

A guide member 64 is also preferrably attached to the horizontal flange portion 30 of frame element 22 at the forward end of the vehicle. Guide member 64 receives a projection 66 which is riveted at 67 to the sun roof cover and extends into the guide member 64 to guide the projection 66 during opening and closing of the sun roof.

Turning now to the seal construction of the present invention, the seal 20 comprises a flexible generally ring shaped member 68. The flexible ring shaped member 68 comprises a relatively solid base member 70 having an upper wall 72 and a bottom wall 74, and a tubular ring shaped bulb 76 formed integrally with the base member 70 and positioned on the upper wall 72 and extending substantially continuously around the top of the base member 70. The bulb 76 is hollow and has upper interior and exterior walls 78 and 80 respectively.

A groove 82 extending continuously around the base member 70 opens from the bottom wall 74 of the base member upwardly into the base member. The groove 82 is positioned and shaped to receive a rigid continuous bead 84 which is formed integrally with and extends upwardly from the horizontal flange 30 of the frame element 22. The rigid bead 84 is shaped to snugly fit into the groove 82 to retain the flexible ring shaped member 68 on the sun roof frame 16 around the perimeter of the opening and beneath the periphery of the sun roof cover 18. The bead 84 also functions to form a dam to prevent leakage of water past the sun roof frame assembly, i.e. any water which may flow downward from the horizontal portion 26 of frame element 22 between the vertical portion 28 and the seal 20.

One or more flexible projections 86 are also preferably formed on the exterior vertical side of the base member 70. These projections 86 define wipers which are forced into compressed contacting engagement with the vertical portion 28 of frame element 22 during installation of the seal on the bead 84 to further seal the sun roof against leakage of water. The positioning of the groove 82 and its bead 84 relative to the vertical portion 28 of frame element 22 is such that compression of the wipers against the vertical portion is assured upon installation.

Another flexible projection 88 also preferably extends from the outer wall of the flexible ring shaped member 28. This projection 88 forms a continuous flap adjacent, but beneath the top of the tubular bulb 76 which overlies the upper horizontal portion 26 of frame element 22 to further seal against the ingress of water. A suitable sealant composition (not shown) may be injected between the flap and the roof to further seal the installation against water leakage.

A plurality of additional flexible projections in the form of wipers 90 are also preferably formed on the upper exterior wall 80 of the tubular bulb 76 as shown in FIG. 2. These wipers 90 are also positioned to engage and be compressed by the underside of cover 18 upon closing.

The seal 20 is preferably formed of a rubber or other suitable weather resistant polymer having a hardness of approximately 60 Durometer. The material may, for example, be a terpolymer elastomer from an ethylene-propylene diene monomer, i.e. EPDM. A suitable polymer for this purpose is available from the Sheller-Globe Company, Montpelier, Ind., as its R-510-EPDM.

Although it is believed that the operation of the seal of the present invention and its assembly will be clear upon considering the foregoing description, a brief description of the operation of the seal upon opening and closing of the sun roof cover follows.

When the cover 18 is opened, the tubular bulb 76 springs upwardly and outwardly as shown in FIG. 2. In this condition its upper exterior wall 80 is elevated above the level of the roof 12 of the vehicle to prevent any residual water which may be on the roof from flowing into the opening. Also, due to this springing action and the elevation of the bulb 76, any water which may have been trapped about the edge of the cover 18 or the seal is thrown outwardly upon opening of the cover.

When the cover is closed as shown in FIG. 3, the edge of the cover 18 compresses the tubular bulb 76 such that the upper interior wall 78 of the bulb is vertically compressed against the upper wall 72 of the base member 70 substantially directly over the rigid bead 84. In this condition a firm seal is realized because the material of the base member 70 as well as of the bulb is directly compressed in a vertical direction against the rigid bead to form a low pressure seal. In addition to this compressed material, sealing is also insured by the wipers 86 which are also further squeezed against the vertical portion 28 of the frame element 22 upon closing of the cover 18 and a portion of the squeezed bulb 76 remains about the perimeter of the cover 18 to fill any space that may be present between the frame element 22 and the edge of the cover, as shown in FIG. 3. The flap 86 and compressed wipers 90 provide additional sealing security against the ingress of water.

It will be understood that the preferred embodiment of the invention which has been described is merely illustrative of only a few of the principles of the present invention. Numerous modifications may be made by those skilled in the art without departing from the scope of the present invention.

What is claimed is:

1. A sun roof assembly for a vehicle comprising:
   substantially continuous ring shaped frame means defining an opening therein, a cover for covering said opening, said cover defining a shape and having perimeter dimensions substantially the same as the shape and dimensions of said ring shaped frame means, hinge means mounting said cover for movement between opening and closing positions relative to said opening, a flexible generally ring shaped member also substantially defining the shape and perimeter dimensions of said cover, said flexible ring shaped member including, a base member having an upper wall and bottom wall, and tubular bulb means positioned on the upper wall of said base member and extending substantially continuously around the top of said base member, said bulb means being hollow and having upper interior and exterior walls, mounting means for mounting said base member on said frame means, said tubular bulb means being sized relative to said frame means and cover and sufficiently flexible such that when said cover is closed, said upper interior wall of said tubular bulb means is compressed by said cover against said upper wall of said base member in a substantially vertical direction to compress the flexible material in said upper wall of said base member also in a substantially vertical downward direction, but when the cover is opened, said bulb means springs upwardly to a level above the elevation of the vehicle roof in which it is installed and said upper interior wall and upper wall of said base member are separated.

2. The assembly of claim 1 including at least one substantially continuous flexible projection extending around the exterior of said ring shaped flexible member and laterally outward from said ring shaped member.

3. The assembly of claim 2 wherein said flexible projection comprises wiper means for contacting a rigid vertical portion of said frame means.

4. The assembly of claim 2 wherein said flexible projection comprises a substantially flexible flap extending laterally outward adjacent, but beneath the top of said flexible member, said flap overlying a rigid horizontal portion of said frame means to form a seal therebetween.

5. The assembly of claim 2 comprising at least a pair of flexible projections, one flexible projection comprising wiper means contacting a rigid vertical portion of said frame means to form a seal therebetween, the other of said pair of flexible projections comprising a substantially flexible flap extending laterally outward adjacent, but beneath the top of said flexible member, said flap overlying a rigid horizontal portion of said frame means to form a seal therebetween.

6. The assembly of claim 5 including at least one additional substantially continuous flexible projection extending upward from said upper exterior wall of said bulb means, said additional flexible projection defining substantially the shape and perimeter dimensions of said cover, whereby it forms a compressed seal between said bulb member and the cover when the cover is closed.

7. The assembly of claim 2 wherein said substantially continuous flexible projection extends upward from said upper exterior wall of said bulb means, said flexible projection defining substantially the shape and perimeter dimensions of said cover, whereby it forms a compressed seal between the bulb member and the cover when the cover is closed.

8. The assembly of claim 1 wherein said flexible generally ring shaped member is formed of a dense flexible material of approximately 60 Durometer hardness.

9. The assembly of claim 1 wherein said flexible generally ring shaped member is formed of EPDM.

10. The assembly of claim 1 wherein said ring shaped frame means includes coupling means for attaching a headliner of said vehicle to said frame means.

11. The assembly of claim 1 wherein said ring shaped frame means comprises a pair of ring shaped elements, one element including a substantially horizontal portion overlying the roof of the vehicle and a substantially vertical portion depending from said horizontal portion, the other said element including a substantially vertical portion bearing against the underside of the roof of the vehicle and a substantially horizontal portion bearing against said vertical portion of the first mentioned element, and means to draw said pair of elements together.

12. The assembly of claim 11 wherein the first mentioned element includes a second substantially horizontal portion, said flexible ring shaped member being mounted upon and extending upwardly from said second horizontal portion.

13. The assembly of claim 11 wherein said ring shaped frame means includes coupling means for attaching a headliner of said vehicle to said frame means, said coupling means being defined by said vertical portion of said first mentioned element and said horizontal portion of said second mentioned element.

14. The assembly of claim 10, including at least one substantially continuous rigid bead on said frame means, and said bead extending upwardly from a horizontal portion of said frame means, and substantially continuous groove means in the bottom wall of said base member extending upwardly toward said upper wall of said base member and substantially parallel to said tubular bulb means, said groove means snugly receiving said rigid bead to mount said base member on said frame means, said tubular bulb means being sized and sufficiently flexible and positioned relative to said bead such that when the cover is closed, said upper interior wall of said tubular bulb means is compressed against said upper wall of said base member substantially vertically above said bead and the flexible material between said bead and said upper wall of said base member is compressed in a vertical direction.

15. The assembly of claim 14 wherein said ring shaped frame means comprises a pair of ring shaped elements, one element including a substantially horizontal portion overlying the roof of the vehicle and a substantially vertical portion depending from said horizontal portion, the other said element including a substantially vertical portion bearing against the underside of the roof of the vehicle and a substantially horizontal portion bearing against said vertical portion of the first mentioned element, and means to draw said pair of elements together.

16. The assembly of claim 15 wherein the first mentioned element includes a second substantially horizontal portion, said rigid bead being mounted upon and extending upwardly from said second horizontal portion.

17. The assembly of claim 1, wherein said tubular bulb means is also sized and sufficiently flexible such that a portion of said upper exterior wall of said tubular bulb means remains about the perimeter of the cover and above the upper exterior wall of the bulb means which is compressed by said cover against said upper wall of said base member when said cover is closed to fill any space that may be present about the perimeter.

* * * * *